United States Patent [19]

Bopp et al.

[11] 4,090,731
[45] May 23, 1978

[54] TILT-CAB LOCKING MEANS

[75] Inventors: Robert D. Bopp; David P. Klosterman, both of Moberly, Mo.

[73] Assignee: Orscheln Brake Lever Mfg. Co., Moberly, Mo.

[21] Appl. No.: 721,976

[22] Filed: Sep. 14, 1976

[51] Int. Cl.² .............................................. B62D 27/06
[52] U.S. Cl. ................................ 296/28 C; 180/89.13; 292/144
[58] Field of Search .......................... 296/28 C, 35 R; 180/89.12, 89.13, 89.14, 89.15; 292/302, 144

[56] References Cited

U.S. PATENT DOCUMENTS

| 3,497,257 | 2/1970 | Hirst | 296/35 |
| 3,581,840 | 6/1971 | Hirst | 296/35 |
| 3,624,761 | 11/1971 | Kohn | 292/144 |
| 3,973,793 | 8/1976 | Hirst | 292/302 |
| 4,022,509 | 5/1977 | Bopp | 292/144 |

Primary Examiner—Joseph F. Peters, Jr.
Assistant Examiner—John A. Carroll
Attorney, Agent, or Firm—Lawrence E. Laubscher

[57] ABSTRACT

Heavy duty locking apparatus is disclosed for locking together a pair of relatively movable members, such as the tilt cab and chassis components of a motor vehicle, wherein a movable locking pin is employed for releasably connecting the blade and housing elements which are respectively secured to said relatively movable members. In one form of the invention, the locking pin is laterally projected into the corresponding opening in the blade element but does not pass completely through the opening. Also, in the one form, the opening or cavity in the housing element is of substantial size in order to present an enlarged target area for entry of the blade element during the locking operation. A second form of the invention is similar to the first form in the above respects and includes a modification of the blade element and the housing part to improve the supporting relationship between these elements during the locking operation.

4 Claims, 10 Drawing Figures

TILT-CAB LOCKING MEANS

BACKGROUND OF THE INVENTION

Various types of locking mechanisms for tilt cab vehicles have been heretofore proposed wherein a blade member carried by the tilt cab is movable into an opening or cavity provided in a pin housing member mounted on the vehicle chassis and wherein a locking pin is so arranged in the pin housing as to be movable through an opening in the blade member to securely lock the tilt cab in proper position. Examples of the prior art devices are disclosed in the U.S. Pat. to Hirst Nos. 3,279,559 and 3,497,257, and Hirst el al U.S. Pat. No. 3,581,840, and the Hirst et al U.S. Pat. No. 3,973,793. Power cylinder means have also been utilized so that the locking and unlocking movements of the locking pin may be remotely controlled. While the prior tilt cab locking devices have generally been regarded as satisfactory under certain conditions, locking operations were sometimes difficult due to the small target area presented to the cab-carried blade when the parts were relatively moved prior to the locking operation. Also in the prior devices, the locking pin was movable completely through the opening in the blade member and the end portion of the pin projected into a further opening in the housing member. Such construction required extremely accurate fitting of the parts of the locking mechanism.

The present invention was developed to provide a simplified locking device which avoids the foregoing disadvantages and which is not only economical to manufacture but is more positive in its locking operation.

OBJECTS OF THE INVENTION

It is accordingly the principal object of the present invention to provide a novel locking means for locking together a pair of components or members, and which is particularly adapted for securely locking a vehicle tilt cab to the vehicle chassis.

Another object is to provide a novel locking device of the foregoing character which includes relatively movable blade and housing members together with an arrangement whereby the blade member may be securely locked within the housing with a minimum of operations.

A further object is to provide the housing member with an opening or cavity providing an enlarged target area for receiving the tilt cab blade member, thereby allowing greater flexibility of the tilt cab.

Still another object comprehends a novel locking arrangement wherein the locking pin does not pass completely through the opening in the blade member, thereby enabling a shorter pin stroke to be utilized while still securing an efficient locking of the blade member within the housing member.

A still further object resides in constructing the locking device in such a manner as to dispense with one of the locking openings in the housing member which has heretofore been necessary.

DESCRIPTION OF THE DRAWING

Further objects and novel features of the invention will appear more fully hereinafter from a consideration of the following detailed description when taken in connection with the accompanying drawing. It will be expressly understood however that the drawing is utilized for purpose of illustration only and is not to be taken as a definition of the limits of the invention, reference being had for this purpose to the appended claims.

In the drawing wherein similar reference characters refer to similar parts throughout the several views:

Referring to FIGS. 1-5, the novel locking assembly of the first form of the invention is illustrated therein as including a blade member 12 which is adapted to be secured to the tilt cab of a vehicle and which may be securely locked to a housing member 14 which is mounted on a chassis part of the vehicle. More particularly the blade member 12 is provided with a depending portion 16 which is adapted to be received in a cavity or opening 18 defined by a pair of opposed upwardly extending sides 20 and 22 and 21 and 23 formed on the housing member 14. As shown in FIG. 1, the blade portion 16 has been moved into the locking position wherein the upper plate 24 of the blade member 12 engages the coplanar horizontal housing surfaces 26 and 28, and 27 and 29 adjacent the upper extremities of the side walls 20, 22, and 21, 23. Also, it will be seen from FIGS. 1 and 5 that the opposed surfaces of all the side walls 20, 22 and 21, 23 are tapered downwardly in a convergent manner and that the outer side surfaces of the blade member 12 are also of a correspondingly downwardly tapered construction. This enables efficient entry of the blade portion 16 into the cavity 18 in the housing portion 14 when it is desired to lock these parts together. The locking pin 30 is axially displaceable relative to a first cavity wall 20, the opposite second cavity wall 22 having a lower portion 22a in parallel contiguous engagement with the blade member, and an upper portion 22b which is inclined outwardly to define an enlarged target area for the blade portion 16 which allows greater flexibility of the tilt cab.

Similarly, the cavity walls 20, 21 and 23 include generally vertical lower portions 20a, 21a and 23a, and outwardly divergent upper portions 20b, 21b and 23b, respectively. As shown in FIG. 1, the angle of divergency of the upper side wall portion 22b is greater than that of the upper side wall portion 20b.

Figure 1:
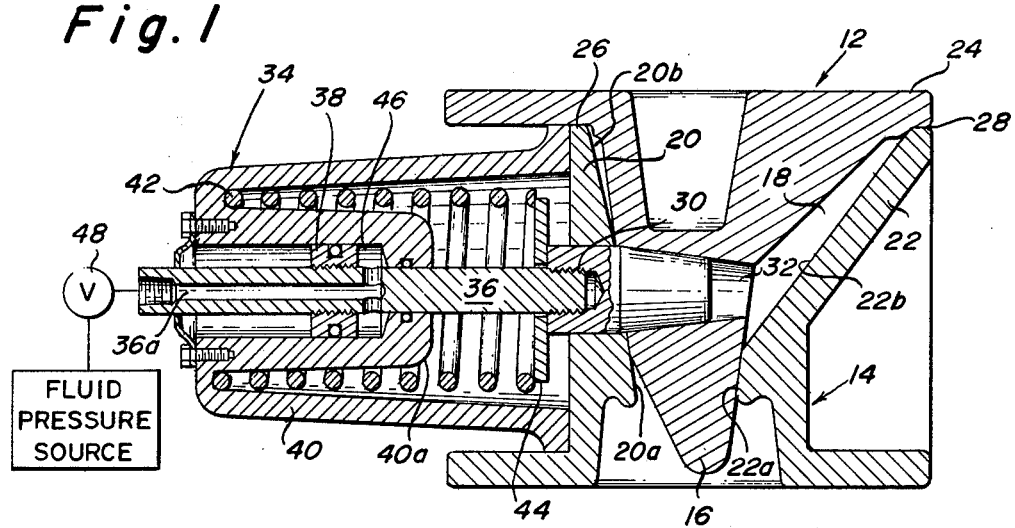
FIG. 1 is a sectional view of a first form of the invention illustrating a tilt cab lock assembly in the locked condition, and taken substantially along line 1—1 of FIG. 2.
Figure 2:
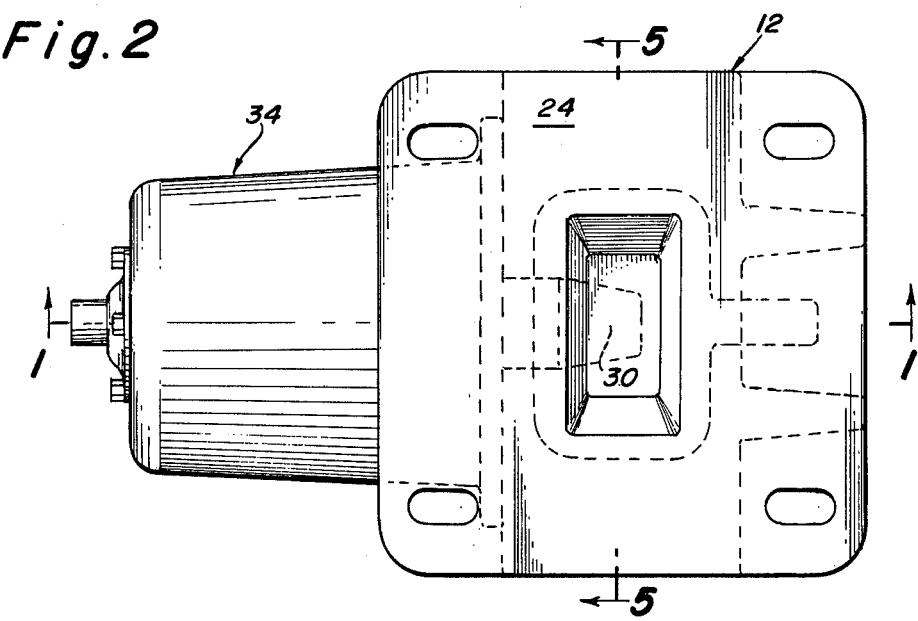
FIG. 2 is a top view of the lock assembly of FIG. 1.
Figure 3:
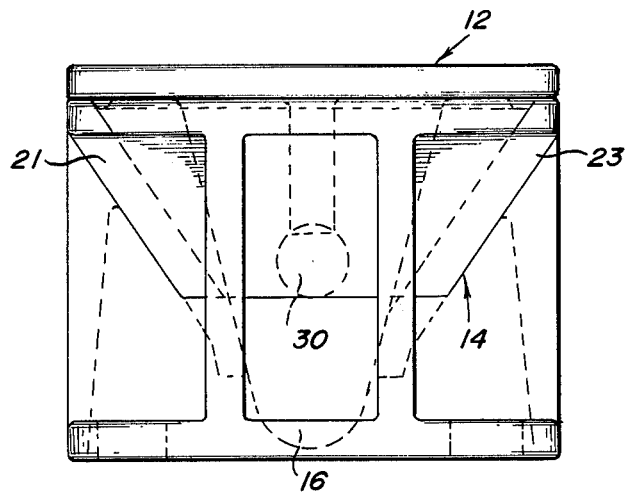
FIG. 3 is a view of one end of the assembly of FIG. 2.
Figure 4:
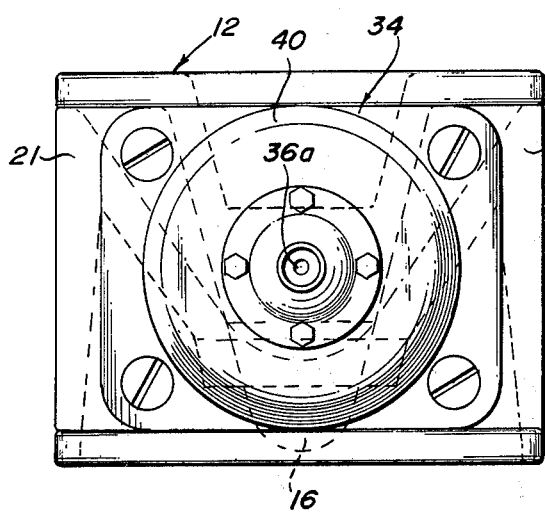
FIG. 4 is a view of the opposite end of the assembly of FIG. 2.
Figure 5:
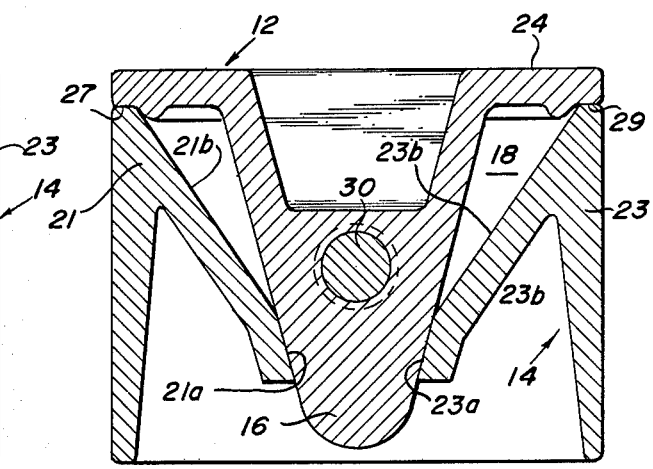
FIG. 5 is a sectional view of the assembly taken at right angles to that of FIG. 1 and substantially along line 5—5 of FIG. 2.

Means are provided for securely locking the blade member 12 to the housing member 14 and in the form shown in FIGS. 1-5 such means includes a locking pin 30 which may be projected into a locking opening 32 formed in the blade portion 16. As shown, the opening 32 extends completely through the blade portion 16 and preferably the pin 30 and the opening 32 are tapered in order to facilitate entry of the pin into the opening. Locking and releasing movements of the pin 30 are effected by power motor means 34 which may be constructed as shown the Bopp et al U.S. Pat. No. 4,022,509 owned by the same assignee as the present application. More particularly, the locking pin 30 is connected with a piston rod 36 connected with a piston 38 that reciprocates within a cylinder portion 40a of a stationary housing 40 that is connected with the blade housing 14. Compression spring 42 arranged concentrically about the cylinder portion 40a between the end wall of the housing 40 and a spring retainer disk 44 connected with the piston rod 36 normally biases the piston rod 36 and the locking pin 30 to the right toward the illustrated locked position. Pressure fluid may be supplied to the working chamber 46 of the piston cylinder motor means via control valve 48 and longitudinal passage 36a, whereby piston rod 36 and locking pin 30 are shifted to the left against the biasing force of spring 42 toward the unlocked position, thereby unlocking the blade member 12 from the housing portion 14.

OPERATION

With the parts occupying the positions illustrated in FIG. 1, wherein the blade portion 16 is locked within the cavity 18 of the pin housing 14, introduction of pressure fluid into the working chamber 46 via valve 48 causes expansion of the piston cylinder motor to shift to the left the piston 38, piston rod 36 and locking pin 30, thereby unlocking the blade portion 16 from the pin housing 14. The tilt cab of the vehicle may now be tilted upwardly toward its elevated position, thereby withdrawing the blade member 12 from the pin housing portion 14. When the pressure of fluid in the working chamber 46 is reduced, the locking pin 30 is shifted to the right by the biasing force of spring 42. In the event it is desired to lower the tilt cab and again perform the locking operation the working chamber 46 is first pressurized to retract the locking pin 30, whereupon the tilt cab may be lowered to introduce the blade member 12 into the cavity of the pin housing member 14. Upon reduction of pressure in the chamber 46, the locking pin 30 is again displaced to the right into the opening 32 in order to lock the parts together.

It is pointed out here that in prior constructions, it has been usual to provide the side walls of the pin housing with aligned openings and to project the locking pin completely through the opening in the blade member of the tilt cab and into the opening in the remote side wall when the parts are locked together. This required accurate positioning of the aligned openings in the legs and also necessitated an excessively long stroke of the locking pin. This has been avoided by the construction just described wherein the locking pin is not projected completely through the opening in the blade member.

Figure 6:
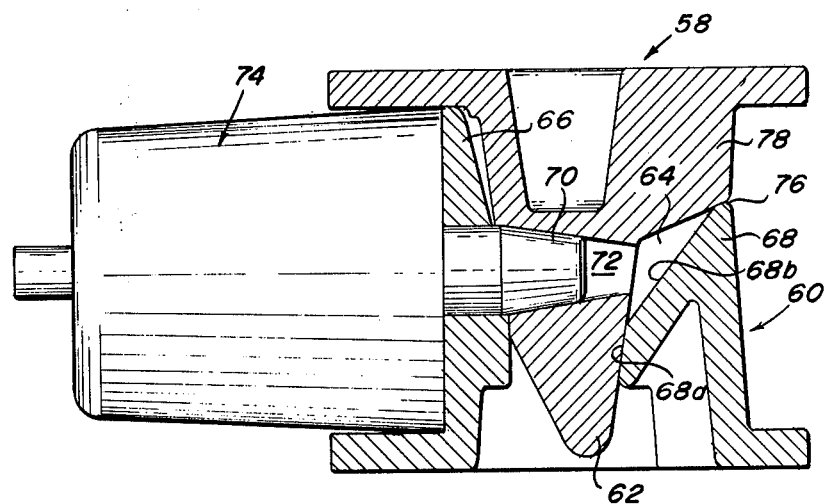
FIG. 6 is a sectional view of a second embodiment of the invention illustrating a tilt cab lock assembly in the locked condition and taken substantially along line 6—6 of FIG. 7.
Figure 7:
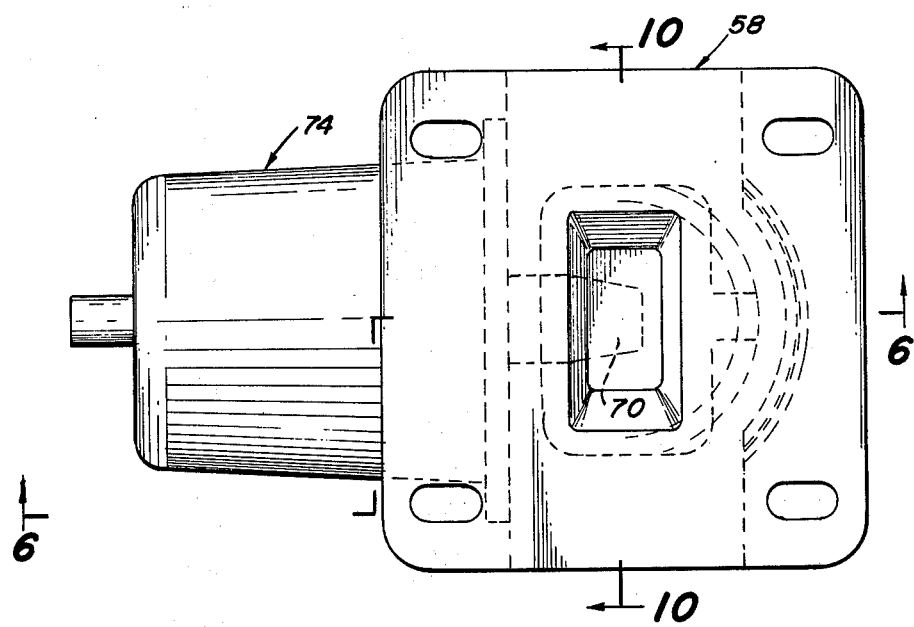
FIG. 7 is a top view of the lock assembly of FIG. 6.
Figure 8:
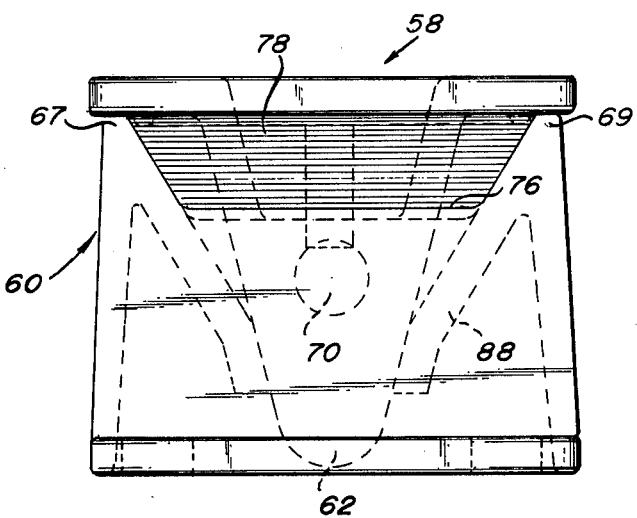
FIG. 8 is a view of one end of the assembly of FIG. 7.
Figures 9, 10:
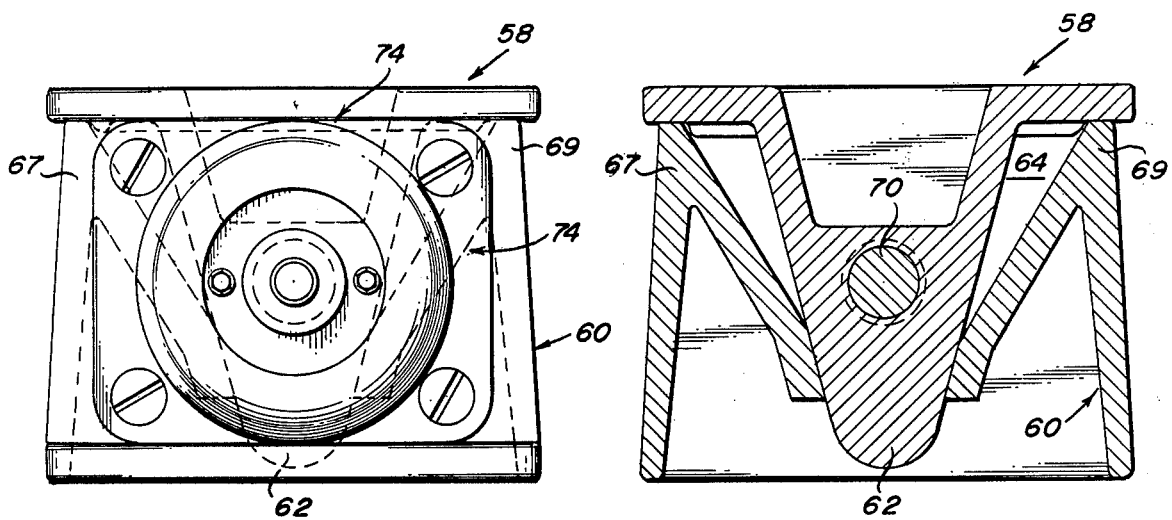
FIG. 9 is a view of the opposite end of the assembly of FIG. 7.
FIG. 10 is a sectional view of the assembly taken at right angles to that of FIG. 6 and substantially along line 10—10 of FIG. 7.

Referring now to FIGS. 6–10, a modified form of a tilt cab locking assembly is illustrated therein as comprising a blade member 58 which may be locked to a pin housing 60, these parts being respectively mounted on a tilt cab and a vehicle chassis part. A depending portion 62 of the blade member 58 is adapted to be received within a cavity or opening 64 defined by a pair of opposed upwardly extending sides 66, 68 and 67, 69 formed on the pin housing 60. As shown in FIG. 6, the blade portion 62 occupies the locked position where a locking pin 70 projects part way through the opening 72, the pin being projected and retracted by a power motor means 74 which is similar to the motor means 34 in FIG. 1. Thus, as in the first form of the invention illustrated in FIGS. 1–5, the locking pin 70 is resiliently moved to locking position and is retracted by fluid pressure operation of the motor means 74. Also, as shown, the side walls 66, 68 and 67, 69 of the housing 60 are tapered in a downwardly converging manner in order to efficiently accommodate the correspondingly tapered blade portion 62. Again, the locking pin 70, which is axially displaceable relative to the first cavity wall 66, and the opening 72 are tapered as shown in order to facilitate easy entrance of the pin into the opening during the locking operation. As will appear from FIG. 6, the pin 70 is illustrated in its fully projected position and thus does not project through the opening 72. This embodiment of the invention thus possesses the same advantages as the first form of the invention, such as the elimination of the aligned openings in the side walls 66 and 68 and the shortening of the stroke of the locking pin 70.

A feature of the second form of the invention resides in the formation of the parts of the pin housing to provide a suitable target area for the tilt cab blade as the parts approach the locking position. More particularly, and as shown, the second cavity side wall 68 includes a lower portion 68a that extends upwardly from the lower portion of the pin housing, and an upper portion 68b that terminates in a horizontal ledge portion 76 which is arranged below the upper housing surface and is adapted to support a downwardly extending flange portion 78 of the blade member 58, see FIGS. 6 and 8. Thus, due to this construction, the cavity or opening provides easier entrance of the blade member during the locking operation and the ledge 76 provides a firm support for the flange portion 78 of the blade member 58.

It will be readily understood from the foregoing that the present invention provides a novel arrangement for securely locking a tilt cab blade member to a chassis-mounted pin housing. The construction of the pin housing is such as to present an enlarged cavity and thus a substantial target area for the blade member thereby facilitating the locking operation and allowing greater flexibility of the tilt cab. The invention also avoids the necessity of having aligned openings in the opposed parts of the pin housing for reception of the locking pin. A further important feature is the securing of a positive and heavy duty locking operation with a power operated locking pin which extends only part way through the locking opening in the tilt cab blade member.

What is claimed is:

1. A locking assembly for locking the tilt cab of a vehicle to the vehicle chassis frame, comprising
   (a) a housing adapted for connection with the chassis frame, the upper portion of said housing containing a cavity of rectangular horizontal cross-sectional configuration including downwardly converging opposed pairs of side walls;
   (b) a blade member adapted for connection at its upper end with the tilt cab, said blade member being arranged to extend downwardly in seated relation within said housing cavity when the tilt cab is in the lowered position relative to the chassis frame, said blade member having a rectangular horizontal cross-sectional configuration and including downwardly convergent opposed pairs of outer surfaces which correspond generally with said cavity wall surfaces, respectively, said blade member containing a horizontally extending locking opening;

(c) a horizontally arranged locking pin connected with a first cavity wall of said housing for axial displacement between locked and unlocked positions relative to said locking opening; and (d) means for displacing said locking pin between its locked and unlocked positions;

(e) said second housing cavity wall opposite said first cavity wall having a lower portion in parallel contiguous seated engagement with the corresponding outer blade surface when the blade member is completely inserted within said housing cavity, the upper portion of said second cavity wall being inclined outwardly from the lower wall portion to define an increased target area for facilitating entry of said blade member into said housing cavity as the tilt cab is lowered toward the chassis frame, said first cavity wall and the pair of opposed cavity walls contiguous therewith terminating at their upper ends in a common horizontal upper housing surface, the upper edge of said second cavity wall terminating in a horizontal ledge positioned below the plane of said housing upper surface, said blade member including horizontal flange portions arranged for seating engagement with said housing upper surface when the tilt cab is in the lowered position, said blade member also including a depending portion arranged for seating engagement with said ledge when the tilt cab is in the lowered position.

2. A locking assembly for locking a tilt cab to a vehicle chassis frame, comprising (a) a housing adapted for connection with the chassis frame, the upper portion of said housing containing a cavity of rectangular horizontal cross-sectional configuration including opposed pairs of side walls, each of said cavity side walls having a generally vertical lower portion, and an outwardly divergent upper portion;

(b) a blade member adapted for connection at its upper end with the tilt cab, said blade member being arranged to extend downwardly in seated relation within said housing cavity when the tilt cab is in the lowered position relative to the chassis frame, said blade member having a rectangular cross-sectional configuration and including tapered opposed pairs of outer surfaces which correspond generally with said lower cavity wall surfaces, respectively;

(c) a horizontal locking pin mounted within an opening contained in a first side wall of said cavity, said locking pin being axially displaceable between locked and unlocked positions relative to a corresponding horizontal locking opening contained in said blade member, the free extremity of said locking pin terminating within said locking opening when the tilt cab is in the lowered position and when said locking pin is in its locked position; and (d) means for displacing said locking pin between its locked and unlocked positions;

(e) the upper portion of the second cavity side wall having a greater angle of divergency than the upper portion of said first cavity side wall, thereby to define an increased target area for facilitating entry of said blade member into said housing cavity as the tilt cab is lowered toward the chassis frame.

3. A locking assembly as defined in claim 2, wherein the free extremity of said locking pin is convergently tapered, and further wherein the locking opening in said blade member is correspondingly convergently tapered, the lower portion of said second cavity wall terminating at a lower elevation than the locking opening.

4. A locking assembly as defined in claim 2, wherein the upper housing surfaces adjacent said first and second cavity walls define a flat horizontal surface, said blade member having a plurality of laterally extending flange portions engaging said horizontal surface when said blade member is in the seated position relative to said housing.

* * * * *